April 7, 1931.  N. I. DYRENKOV  1,799,219
VARIABLE SPEED TRANSMISSION
Filed June 4, 1930   3 Sheets-Sheet 1
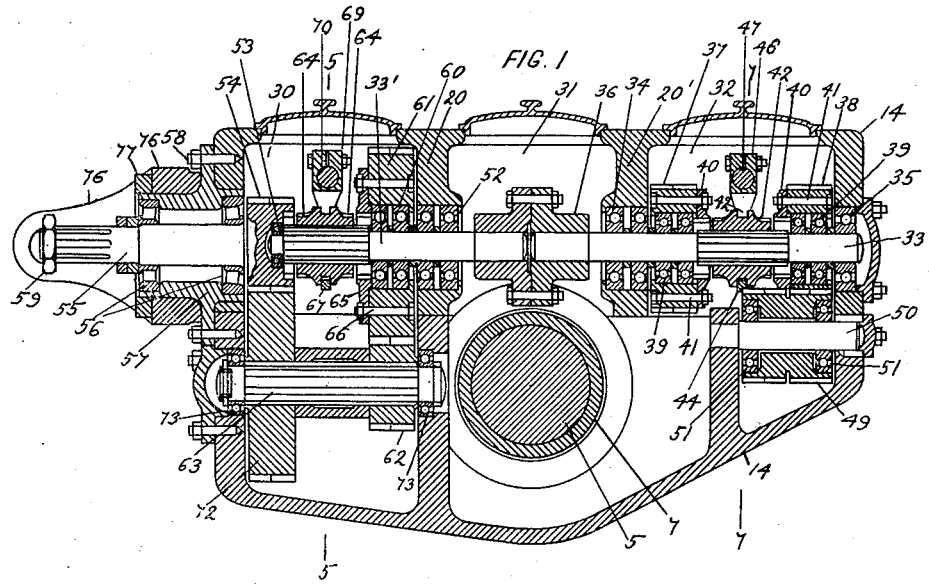
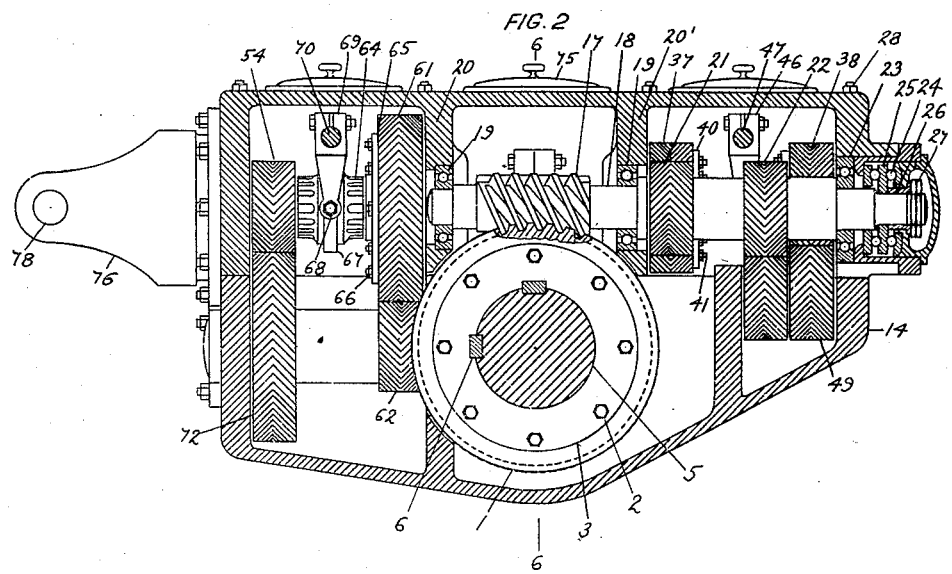
NIKOLAI I. DYRENKOV
INVENTOR
BY John P. Mironov
ATTORNEY

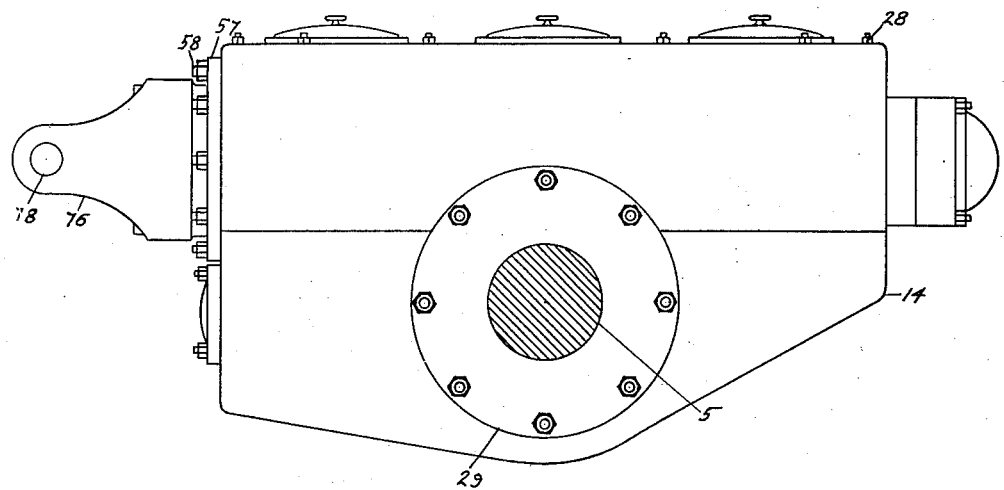
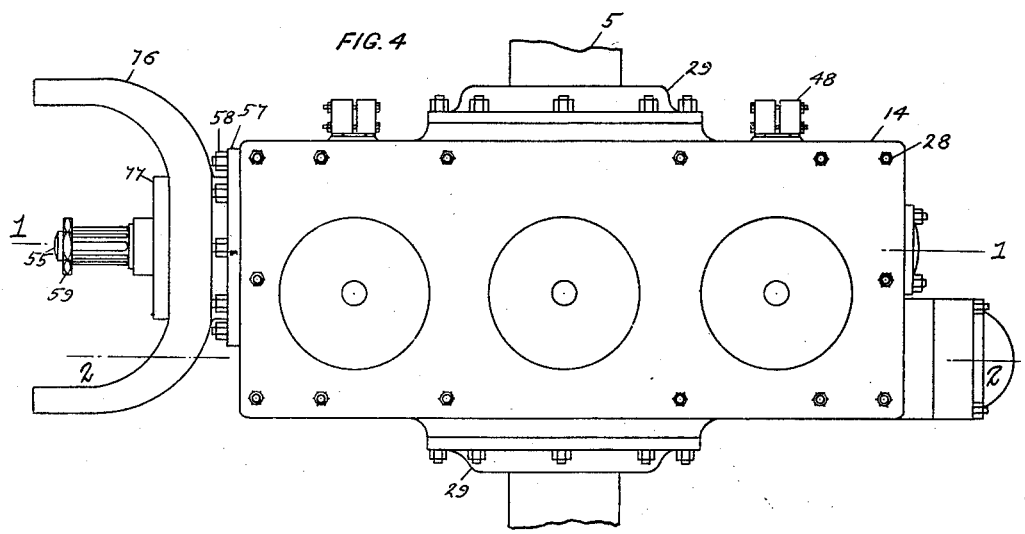

April 7, 1931.  N. I. DYRENKOV  1,799,219
VARIABLE SPEED TRANSMISSION
Filed June 4, 1930  3 Sheets-Sheet 3
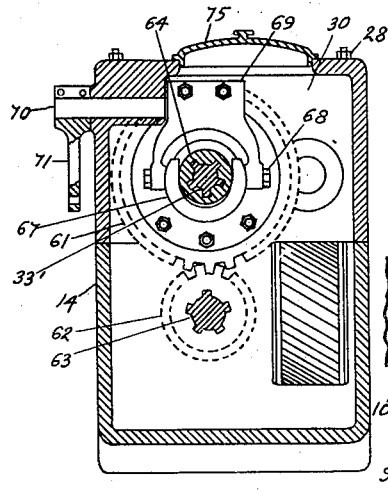
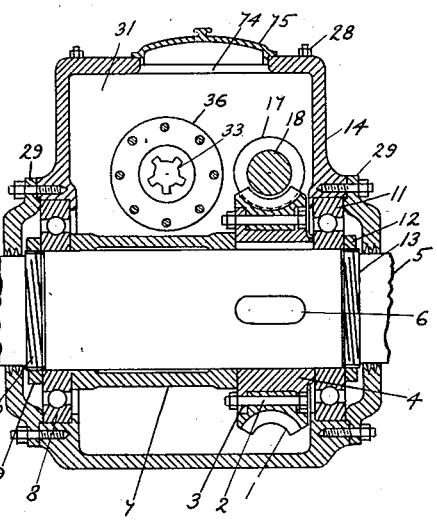
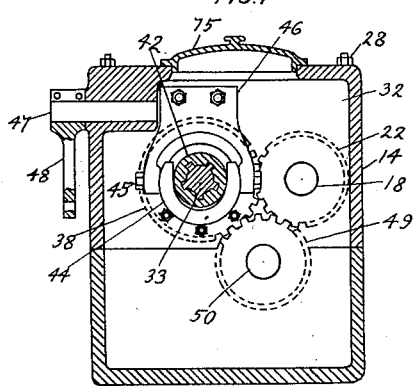
NIKOLAI I. DYRENKOV
INVENTOR
ATTORNEY Patented Apr. 7, 1931

1,799,219

UNITED STATES PATENT OFFICE

NIKOLAI I. DYRENKOV, OF ODESSA, UNION OF SOVIET SOCIALIST REPUBLICS

VARIABLE-SPEED TRANSMISSION

Application filed June 4, 1930, Serial No. 459,171, and in the Union of Socialist Soviet Republics December 18, 1928.

My invention relates to variable speed transmissions and has a particular reference to geared transmissions with disconnecting clutches.

The object of my invention is to provide a transmission which can be used for self propelled vehicles employing internal combustion engines and especially for vehicles of a locomotive type.

Another object of my invention is to provide a transmission with gear reductions for two different speeds (or ratios) which can be changed with the locomotive in motion, and an additional reverse gear, all these gears being always in mesh in order to avoid a clash of teeth when changing the gears, the latter operation being performed by means of special clutches. I have also arranged my transmission so that it is impossible to throw in the operation at the same time different gear ratios thereby avoiding a possible gear breakage from this source.

Still another object of my invention is to provide a transmission which can be easily adapted to a locomotive frame of a standard type with standard wheel axles thereby eliminating the necessity of designing a special frame or a special locomotive.

My invention is more fully described in the accompanying specification and drawing in which—

Fig. 1 is a sectional view taken on the line 1—1 (Fig. 4), Fig. 2 is a sectional view taken on the line 2—2 (Fig. 4), Fig. 3 is a side view of my transmission, Fig. 4 is a top plan view of same, Fig. 5 is a section taken on the line 5—5 (Fig. 3), Fig. 6 is a section taken on the line 6—6 (Fig. 3), and Fig. 7 is a section taken on the line 7—7 (Fig. 3).

My transmission consists of a worm gear 1 made in two halves split on a diagonal line so as not to cut across its teeth. The gear is bolted with bolts 2 between flanges 3 of a ring 4 placed on a wheel axle 5 and prevented from rotation or slippage by keys 6. The ring rests against a sleeve 7 the other end of which is pressed against a ball bearing 8 retained by a nut 9 on the threads 10.

A second ball bearing 11 is placed on the axle 5 against the ring 4 and is clamped by a nut 12 on the threads 13. The collars, bearings and nuts are assembled on the axle before the second wheel is pressed on, but the worm gear is assembled afterwards and can be removed and replaced, if necessary, without removing the axle from under the locomotive or without removing one of the wheels from the axle.

A gear case or housing 14 is supported on the ball bearings 8 and 11 and is held stationary by being attached to the locomotive frame with its lug 76 with bolt holes 78.

A worm or worm pinion 17 is in mesh with the gear 1 and is mounted on a shaft 18 (or cut integrally with it). The worm shaft is supported in bearings 19 in brackets or lugs 20 inside of the case 14. The shaft 18 extends on one side of the gear supporting two pinions 21 and 22 the latter being smaller in diameter. The end of the shaft is supported in a bearing 23. The end thrust is taken by two thrust bearings 24 with a washer 25 between them clamped on the end of the shaft by a bushing 26 and nut 27.

The gear case 14 consists of two halves bolted together around the axle 5 by studs 28 and provided with side caps 29 covering the ball bearings 8 and 11. The case overhangs on both sides of the axle, there being transmission gears in it on both sides.

The upper half of the case is divided in three compartments 30, 31 and 32 by lugs or partitions 20 and 20'. The compartments contain another or intermediate shaft 33 placed parallel with the worm shaft 18 and supported in bearings 34 and 35. For convenience of assembling the shaft is made in two halves, 33 and 33', joined together in the middle by a coupling 36.

The shaft portion 33' has pinions 37 and 38 in mesh with pinions 21 and 22 and mounted on ball bearings 39. Internal clutch gears 40 are bolted to these pinions 37 and 38 on the inside with bolts 41.

The middle portion of the shaft 33 is splined for a sliding clutch bushing 42 with jaws or teeth on its ends adapted to alternately engage the corresponding teeth or jaws in the gears 40. The bushing has a circular groove 43 in the middle for a ring 44 with trunnions 45 pivotally connected with the ends of a shifting fork 46. The fork is attached to a shifting shaft 47 rotatively supported in the wall of the housing and provided outside with a crank handle 48 connected with an operating rod (not shown) extending from the engineer's control post.

Pinions 21 and 37 are directly in mesh but pinion 38 and 22 have an intermediate pinion 49 with a long face overlapping both pinions. It is mounted on a separate jack shaft 50 rigidly supported in the lower half of the case 14. The pinion 49 is mounted on the jack shaft by means of ball bearings 51.

The shaft 33' is supported in a ball bearing 52 in the wall 20. Its outer end is supported in a ball bearing 53 in a pinion 54 mounted on the end of a driving shaft 55 supported in roller bearings 56 in the end cap 57 attached to the case 14 with bolts 58. The free end of the shaft is splined and provided with threads and a nut 59 for connecting it with a universal joint or coupling from the engine.

The shaft 33' has ball bearings 60 supporting a gear 61 in mesh with a pinion 62 on a front jack shaft 63. The free portion of the shaft 33' between the gears 54 and 61 is splined for a sliding clutch sleeve 64 provided with teeth or jaws on its ends. These teeth are adapted to alternately engage the corresponding internal teeth in a ring gear 65 attached to the gear 61 with bolts 66 and internal teeth in the pinion 54. The sleeve or bushing 64 has a circular groove in the middle for a ring 67 with trunnions 68 connected with the ends of a front shifting fork 69 attached to a shaft 70 journaled in the side wall of the case 14 and provided with a crank handle 71 on the end connected with a rod (not shown) extending from the engineer's control post.

The pinion 54 is in mesh with a pinion or gear 72 mounted on the jack shaft 63. The latter is supported in ball bearings 73 in the walls of the housing 14.

The lower portion of the case 14 has also three compartments corresponding to the upper compartments 30, 31 and 32, for the jack shaft 63 with its gears 62 and 72, for the worm gear 1, and for the rear jack shaft 50 with the pinion 49. The top of the case 14 has three ports 74 with covers 75 for these compartments.

The end cap 58 supports a fork 76 held in place by a nut 77 and provided with holes 78 for attaching it to the frame or to the clutch housing (not shown).

The operation of my transmission is as follows.

The rear portion of the transmission in the compartment 32 has reverse gears 38, 49 and 22 which can be engaged with the intermediate shaft by shifting the clutch sleeve 42. By shifting the clutch sleeve in the opposite direction the pinion 37 becomes connected with the intermediate shaft thereby connecting the shafts 33 and 18 for a forward speed.

By shifting the front shifting clutch sleeve 64 to the rear, the gear 61 becomes connected with the shaft 33' so that the drive from the shaft 55 is transmitted through a gear reduction of pinions 54 and 62 and gears 61 and 72, and through forward or reverse gears in the rear of the case, depending which set of gears is connected by the sleeve clutch 42.

For a direct drive the clutch 64 is shifted forward engaging the teeth in the pinion 54 and thereby directly coupling the shafts 55 and 33'. The gears 61, 62 and 72 will then rotate idly.

Different sets of gears are running in three compartments of the transmission case and can be filled with a lubricant through ports 74.

Important advantages of my transmission are that it can be easily assembled on a driving axle of a locomotive and can be removed without removing the wheels from the axle. The main crown worm gear can be also assembled or removed without disturbing the driving wheels on the axle. The transmission is practically evenly balanced on the axle and does not hang heavily on any other parts of the mechanism or on the driving shaft. The gears are constantly in mesh so that they can be made of an improved design, such as spiral or herringbone, so as to make them noiseless. The clash of teeth is avoided when the gears are changed, the change being made by special jaw clutches which can be made especially rugged for this purpose. The gear changes are made by two independent shifting forks so arranged that it is impossible to damage the transmission by connecting interfering gears.

I claim as my invention:

1. In a variable speed transmission, the combination with a gear adapted to be mounted on an axle of a self-propelled vehicle, of a pinion in mesh with said gear, a shaft for said pinion, a gear case rotatively supporting said shaft and enclosing said gear with said pinion, bearings on said axle supporting said gear case, an intermediate shaft rotatively supported in said gear case, forward and reverse geared connections between said shafts, a jaw clutch adapted to be manually operated and adapted to selectively connect said forward or said reverse gears with said shafts, a driving shaft rotatively supported in said gear case, speed reduction gears between said driving and said intermediate shafts, and a jaw clutch adapted to selectively connect said driving and said intermediate shafts directly together or through said speed reducing gears.

2. In a variable speed transmission, the combination with a gear adapted to be mounted on an axle of a self propelled vehicle, of a pinion in mesh with said gear, a shaft for said pinion, a gear case enclosing said gear with said pinion and rotatively supporting said shaft, bearings on said axle for said gear case, an intermediate shaft rotatively supported in said gear case, forward and reverse geared connections between said shafts located in the rear portion of said gear case, means to manually and selectively render said forward or said reverse connections operative, a driving shaft rotatively supported in the forward portion of said gear case, speed reduction gears between said driving and said intermediate shafts, means to selectively render said speed reducing gears operative or to connect directly said driving and said intermediate shafts, and means to prevent said gear case from turning on said axle, the forward and the rear portions of said gear case being substantially balanced around said axle.

3. In a variable speed transmission, the combination with a gear adapted to be mounted on an axle of a self propelled vehicle, of a pinion in mesh with said gear, a shaft for said pinion extending at right angles with said axle, a gear case enclosing said gear with said pinion and rotatively supporting said shaft, bearing on said axle for said gear case, an intermediate shaft rotatively supported in said gear case, forward and reverse geared connections between said shafts, a jaw clutch slidably mounted on said intermediate shaft between said geared connections and adapted to selectively connect said forward or said reverse connections, a driving shaft rotatively supported in said gear case, direct drive and speed reduction connections between said driving and said intermediate shafts, a jaw clutch slidably mounted on said intermediate shaft between said direct drive and speed reduction connections, said clutch being adapted to selectively connect said shafts directly or through said speed reduction gearing, and partitions in said gear case adapted to form separate compartments for said forward and reverse geared connections, for said axle gear with its pinion, and for said speed reduction and direct drive connections.

4. In a variable speed transmission, the combination with a worm gear made of two halves and adapted to be mounted on an axle of a self propelled vehicle, of a worm pinion in mesh with said gear, a shaft for said worm pinion, a gear case rotatively supporting said shafts and enclosing said gear with said worm pinion, an intermediate shaft rotatively supported in said gear case, reverse and forward geared connections between said shaft, a clutch between said connections adapted to selectively render said connections operative, a drive shaft rotatively supported in said gear case in alignment with said intermediate shaft, speed reduction gears between said intermediate and said drive shafts, a direct drive connection between said drive and said intermediate shafts, a clutch between said speed reduction gears and said direct drive connection, said clutch being adapted to selectively connect said speed reduction gears or said direct drive, and means to support said gear case on said self propelled vehicle.

In testimony whereof, I affix my signature.

NIKOLAI I. DYRENKOV.